United States Patent
Shaikh (10) Patent No.: US 9,309,339 B2
(45) Date of Patent: Apr. 12, 2016

(54) MID-RANGE VINYLIDENE CONTENT, HIGH VISCOSITY POLYISOBUTYLENE POLYMERS

(71) Applicant: TPC Group LLC, Houston, TX (US)

(72) Inventor: Sohel K. Shaikh, Dhahran (SA)

(73) Assignee: TPC Group LLC, Houston, TX (US)

( * ) Notice: Subject to any disclaimer, the term of this patent is extended or adjusted under 35 U.S.C. 154(b) by 176 days.

(21) Appl. No.: 14/346,860

(22) PCT Filed: Oct. 10, 2012

(86) PCT No.: PCT/US2012/059473
§ 371 (c)(1),
(2) Date: Mar. 24, 2014

(87) PCT Pub. No.: WO2013/062759
PCT Pub. Date: May 2, 2013

(65) Prior Publication Data
US 2014/0235810 A1    Aug. 21, 2014

Related U.S. Application Data

(60) Provisional application No. 61/551,547, filed on Oct. 26, 2011.

(51) Int. Cl.
*C08F 10/10* (2006.01)
*C08F 110/10* (2006.01)
(Continued)

(52) U.S. Cl.
CPC ........... *C08F 110/10* (2013.01); *B01J 19/1837* (2013.01); *B01J 19/1881* (2013.01); *C08L 23/22* (2013.01); *B01J 2219/0022* (2013.01); *B01J 2219/00065* (2013.01); *B01J 2219/00081* (2013.01); *B01J 2219/00094* (2013.01);
(Continued)

(58) Field of Classification Search
CPC ....... C08F 10/10; C08F 110/10; C08F 210/10
See application file for complete search history.

(56) References Cited

U.S. PATENT DOCUMENTS

| 4,152,499 A | 5/1979 | Boerzel et al. |
| 4,605,808 A | 8/1986 | Samson |

(Continued)

FOREIGN PATENT DOCUMENTS

EP    1242464 B1    4/2011

OTHER PUBLICATIONS

Supplementary/Extended European Search Report dated May 18, 2015.

*Primary Examiner* — Richard A Huhn
(74) *Attorney, Agent, or Firm* — Michael W. Ferrell (57) ABSTRACT

A mid-range vinylidene content, high viscosity PIB polymer composition including PIB molecules, wherein a first portion of the PIB molecules have alpha position double bonds and a second portion of the PIB molecules have beta position double bonds, and the first and second portions together include at least 80 mole % of the PIB molecules of the composition. The first portion includes less than 75 mole % of the PIB molecules of the composition. Additionally, no more than 10 mole % of the PIB molecules of the composition have tetra-substituted double bonds, while the composition is further characterized by having a polydispersity of no more than 2.7 and in that the composition has a kinematic viscosity in the range of 3000 cSt to 5000 cSt, a number average molecular weight, Mn, in the range of 2800 Daltons to 4000 Daltons and a ratio of Mn:PDI of greater than 1100.

20 Claims, 5 Drawing Sheets

(51) Int. Cl.
*C08L 23/22* (2006.01)
*B01J 19/18* (2006.01)
*C08F 210/10* (2006.01)

(52) U.S. Cl.
CPC ............... *B01J2219/00162* (2013.01); *B01J 2219/00231* (2013.01); *C08F 10/10* (2013.01); *C08F 210/10* (2013.01)

(56) References Cited

U.S. PATENT DOCUMENTS

| | | |
|---|---|---|
| 5,068,490 A | 11/1991 | Eaton |
| 5,191,044 A | 3/1993 | Rath et al. |
| 5,286,823 A | 2/1994 | Rath |
| 5,408,018 A | 4/1995 | Rath |
| 5,962,604 A | 10/1999 | Rath |
| 7,037,099 B2 | 5/2006 | Linke et al. |
| 7,037,999 B2 * | 5/2006 | Baxter et al. ............... 526/348.7 |
| 7,038,008 B2 | 5/2006 | Wettling et al. |
| 7,056,990 B2 | 6/2006 | Baxter, Jr. et al. |
| 7,091,285 B2 | 8/2006 | Baxter, Jr. et al. |
| 7,217,773 B2 | 5/2007 | Rath et al. |
| 7,485,764 B2 | 2/2009 | Rath et al. |
| 7,498,396 B2 | 3/2009 | Baxter, Jr. et al. |
| 2010/0298507 A1 * | 11/2010 | Menschig et al. .............. 526/64 |

* cited by examiner

*FIG. 1*
CONVERSION AS A FUNCTION OF DELTA P (CIRCULATION RATE);
MID RANGE VINYLIDENE PIB; NOMINAL Mn of 3000

$$Q = \dot{m} \, c_p (t_1 - t_2) = \dot{M} \, C_p (T_1 - T_2) \quad (1)$$

$$Q = U \, A \, F_t \, \Delta t \quad (2)$$

$$\Delta t = \frac{(T_1 - t_2) - (T_2 - t_1)}{\ln\left\{\frac{(T_1 - t_2)}{(T_2 - t_1)}\right\}} \quad (3)$$

$$F_t = \frac{\sqrt{R^2 + 1}}{R - 1} \, \frac{\ln \frac{(1-S)}{(1-RS)}}{\ln \frac{2 - S(R + 1 - \sqrt{R^2 + 1})}{2 - S(R + 1 + \sqrt{R^2 + 1})}} \quad (4)$$

$$R = \frac{(T_1 - T_2)}{(t_2 - t_1)} \; ; \; S = \frac{(t_2 - t_1)}{(T_1 - t_1)} \quad (5)$$

$$U = Q / (A \, F_t \, \Delta t) \quad (6)$$

FIG. 4
CATALYST TURNOVER VS. VELOCITY, MID RANGE VINYLIDENE PIB, NOMINAL Mn 3300

MID-RANGE VINYLIDENE CONTENT, HIGH VISCOSITY POLYISOBUTYLENE POLYMERS

CROSS-REFERENCE TO RELATED APPLICATION

This application is based upon International Application Serial No. PCT/US2012/059473, filed Oct. 10, 2012, which was, in turn, based upon U.S. Provisional Application Ser. No. 61/551,547, filed Oct. 26, 2011. The priorities of International Application Serial No. PCT/US2012/059473 and Provisional Application Ser. No. 61/551,547 are hereby claimed and their disclosures incorporated by reference into this application in their entirety.

TECHNICAL FIELD

This invention relates to polyisobutylene polymers having a kinematic viscosity in the range of 2800 cSt to 5000 cSt and a polydispersity of no more than 2.7.

BACKGROUND OF INVENTION

The polymerization of olefins using Friedel-Crafts type catalysts, such as boron trifluoride and aluminum trichloride is well known. The degree of polymerization of the products obtained varies according to which of the various known polymerization techniques is used and also varies with the parameters used to control the reaction. The molecular weight of the polymeric product is directly related to the degree of polymerization and that the degree of polymerization may be manipulated by manipulating process parameters so as to produce a variety of products having respective desired average molecular weights. Due to the nature and mechanics of the olefinic polymerization process, a polyolefin product has a single double bond remaining in each molecule at the end of the polymerization process. The position of this remaining double bond is often an important feature of the product. For example, polyisobutylene (PIB) molecules wherein the remaining double bond is in a terminal (vinylidene) position are known to be more reactive than PIB molecules wherein the remaining double bond is internal, that is, not in a terminal position. A PIB product wherein most of the double bonds are in a terminal position may often be referred to as high vinylidene or reactive PIB. The extent to which a polyolefin product has terminal double bonds may also be manipulated by manipulation of process parameters.

It is also known that alpha olefins, particularly PIB, may be manufactured in at least two different classes of material—regular and high vinylidene. Conventionally, these two product grades have been made by different processes, but both often and commonly use a diluted feedstock in which the isobutylene concentration may range from 40 to as high as 90% by weight. Non-reactive hydrocarbons, such as isobutane, n-butane and/or other lower alkanes commonly present in petroleum fractions, may also be included in the feedstock as diluents. The feedstock often may also contain small quantities of other unsaturated hydrocarbons such as 1-butene and 2-butene.

High vinylidene, or highly reactive PIB, a relatively new product in the marketplace, is characterized by a large percentage of terminal double bonds, typically greater than 75% and preferentially greater than 80%. This provides a more reactive product, compared to regular PIB, and hence this product is also referred to as highly reactive PIB. The terms highly reactive (HR-PIB) and high vinylidene (HV-PIB) are synonymous. The basic processes for producing HR-PIB all include a reactor system, employing $BF_3$ and/or modified $BF_3$ catalysts, such that the reaction time can be closely controlled and the catalyst can be immediately neutralized once the desired product has been formed. Since formation of the terminal double bond is kinetically favored, short reactions times favor high vinylidene levels. The reaction is quenched, usually with an aqueous base solution, such as, for example, $NH_4OH$, before significant isomerization to internal double bonds can take place. Molecular weights are relatively low. HR-PIB having an average molecular weight of about 950-1050 is the most common product. Conversions, based on isobutylene, are kept at 75-85%, since attempting to drive the reaction to higher conversions reduces the vinylidene content through isomerization. Prior U.S. Pat. No. 4,152,499 dated May 1, 1979, prior U.S. Pat. No. 4,605,808 dated Aug. 12, 1986, prior U.S. Pat. No. 5,068,490 dated Nov. 26, 1991, prior U.S. Pat. No. 5,191,044 dated Mar. 2, 1993, prior U.S. Pat. No. 5,286,823 dated Jun. 22, 1992, prior U.S. Pat. No. 5,408,018 dated Apr. 18, 1995 and prior U.S. Pat. No. 5,962,604 dated Oct. 5, 1999 are all directed to related subject matter.

Other than the HR grades and the regular grades of PIB, a certain grade of PIB known as the enhanced grade has been more recently developed (EP 1381637 and related patents discussed below). An advantage of these products is that the overall reactivity is high without the need for high vinylidene content. Mid-range vinylidene PIB is manufactured using less catalyst and complexing agent than highly reactive PIB as is seen in the comparative examples. Moreover, mid-range vinylidene PIB may be made with a lower polydispersity than a corresponding grade of highly reactive PIB; the product may also be made at higher temperature differentials between the coolant and reaction medium in a shell and tube reactor which is easier to control and leads to higher conversion of monomer.

The following patents describe mid-range vinylidene content polyisobutylene (PIB) polymers and processes for producing them: U.S. Pat. Nos. 7,037,099; 7,091,285; 7,056,990; and 7,498,396. The products are characterized in that at least about 90% of the PIB molecules present in the product comprise alpha or beta position isomers. The vinylidene (alpha) isomer content of the product may range from about 20% to about 70% thereof and the content of tetra-substituted internal double bonds is very low, preferably less than about 10% or 5% and ideally less than about 1-2%. The midrange vinylidene content PIB polymer products are prepared by a liquid phase polymerization process conducted in a loop reactor at a temperature of at least 60° F. using a $BF_3$/methanol catalyst complex and a contact time of no more than 4 minutes.

SUMMARY OF INVENTION

Despite numerous advances in the art, there is a need to provide more energy efficient and higher yield processes as well as PIB material having lower polydispersity, especially at higher molecular weights and kinematic viscosity. There is thus provided in accordance with this invention a mid-range vinylidene content, high viscosity PIB polymer composition including PIB molecules, wherein a first portion of the PIB molecules have alpha position double bonds and a second portion of the PIB molecules have beta position double bonds, and the first and second portions together include at least 80 mole % of the PIB molecules of the composition. The first portion includes less than 75 mole % of the PIB molecules of the composition. Additionally, no more than 10 mole % of the PIB molecules of the composition have tetrasubstituted double bonds, while the composition is further characterized by having a polydispersity of no more than 2.7 and in that the composition has a kinematic viscosity in the range of 3000 cSt to 5000 cSt, a number average molecular weight, Mn, in the range of 2800 Daltons to 4000 Daltons and a ratio of Mn:PDI of greater than 1100.

In connection with the invention, products produced have unexpectedly lower polydispersities at higher molecular weight, contrary to the teachings of the prior art. This feature is particularly desirable when the products are used for making derivatives such as alkyl phenols and/or fuel or lubricating oil additives. Higher polydispersities are related to higher engine deposits. Mid-range vinylidene PIB has the further advantage that fewer by-products may be produced when derivatizing the materials as compared with highly reactive PIB.

The inventive compositions are produced at relatively high linear velocity in the reaction tubes which leads to higher conversion and lower polydispersity than conventional processing methods. Note FIG. 1, wherein it is seen that conversion increases by about 10% as the pressure differential (DP) across a recirculating pump increases from 35 psi to 65 psi.

Conventional boron trifluoride catalyst systems reported in the patent literature typically produce somewhat less than 900 lbs PIB/lb of $BF_3$ and typically less than 450 lbs PIB/lb of $BF_3$, as is seen in the following U.S. Pat. Nos. 7,485,764; 7,217,773; and 7,038,008, discussed below in connection with catalyst consumption. Catalyst productivity of 2 to 4 times higher than reported in the literature and 2 to 3 times higher than seen in connection with highly reactive PIB manufactured under like conditions is readily achieved when making products of the present invention.

Still further features and advantages of the invention will become apparent from the discussion which follows.

BRIEF DESCRIPTION OF DRAWINGS

The invention is described in detail below with reference to the various Figures, wherein.

DETAILED DESCRIPTION OF INVENTION

The invention is described in detail below with reference to several embodiments and numerous examples. Such discussion is for purposes of illustration only. Modifications to examples within the spirit and scope of the present invention, set forth in the appended claims, will be readily apparent to one of skill in the art. Terminology used throughout the specification and claims herein is given its ordinary meaning, for example, psi refers to pressure in lbs/inch and so forth. Terminology is further defined below.

The improved products of the present invention are made with a Friedel-Crafts catalyst which is complexed with a complexing agent. Many useful Friedel-Crafts catalysts are known to those of ordinary skill in the related art field. In particular, many useful catalysts are described in the patents referenced above. Useful Friedel-Crafts catalysts include, for example, $BF_3$, $AlCl_3$, $TiCl_4$, $BCl_3$, $SnCl_4$ and $FeCl_3$ and the like. The complexing agent for the catalyst, and in particular for the $BF_3$ catalyst, may be any compound containing a lone pair of electrons, such as, for example, an alcohol, an ester or an amine. For purposes of the present invention, however, the complexing agent may be an alcohol, desirably a primary alcohol, preferably a $C_1$-$C_8$ primary alcohol (such as, for example, methanol, ethanol, propanol, isopropanol, hexyl alcohol and the like) and ideally methanol. The molar ratio of $BF_3$ to complexing agent in the catalyst composition is generally in the range of from approximately 0.5:1 to approximately 5:1 respectively, desirably within the range of from approximately 0.5:1 to approximately 2:1, and preferably within the range of from approximately 0.5:1 to approximately 1:1. Ideally, the catalyst composition may simply be a 1:1 complex of $BF_3$ and methanol as is seen in the examples. For purposes of convenience, "catalyst" refers to a Friedel-Crafts catalyst of the class described above, while "catalyst complex" refers to the Friedel-Crafts catalyst and complexing agent up to a 1:1 molar ratio. When complexing agent is used in a molar excess with respect to the Friedel-Crafts catalyst it is referred to herein as modifier.

"Catalyst complex turnover number" and like terminology refers to the weight of polymer produced per unit weight of catalyst complex employed in the process.

"Consisting essentially of" and like terminology refers to the recited components and excludes other ingredients which would substantially change the basic and novel characteristics of the mixture or composition. Unless otherwise indicated or readily apparent, a composition or mixture consists essentially of the recited components when the composition or mixture includes 95% or more by weight of the recited components. That is, the terminology excludes more than 5% unrecited components.

Conversion of the reaction mixture to polymer is expressed in weight percent and calculated as the weight of polymer produced less the weight of isobutylene fed to the reaction system divided by the weight of isobutylene fed to the reaction system times 100%.

Polyisobutylene, "PIB" and like terminology refers to polymers made up of repeat units derived from isobutene, also referred to as isobutylene.

isobutene

Such polymers are derived from feedstocks made up of purified isobutenes and hydrocarbon diluents, from isobutene concentrate, dehydro effluent, or from raffinate streams. The PIB polymer consists essentially of repeat units derived from isobutylene, but may contain minor amounts of material derived from 1-butenes, butadiene or other $C_4$ olefins, 2-butenes (cis and/or trans) depending on the feedstock composition. Typically, the polymer is more than 99% by weight derived from isobutylene monomer. Particular compositions of interest in connection with the present invention have a number average molecular weight of from 500 to 4000 Daltons and in preferred embodiments significant amounts of alpha vinylidene terminated molecules:

alpha

Highly reactive (HR) PIB polymer compositions typically include more than 80 mole % alpha molecules, while mid-range vinylidene content PIB products contain less alpha and more beta olefin isomers (1,1,2-trisubstituted or 1,2,2-trisubstituted cis or trans isomer):

1,1,2 trisubstituted beta 1,2,2 trisubstituted cis isomer beat

Other structures which may be present include tetrasubstituted structures, other trisubstituted structures with a double bond in the internal gamma position, structures with other internal double bonds and aliphatic structures, for example:

tetra    tetra gamma aliphatic

When calculating endgroup percentages, all PIB molecules found in the PIB compositions having a significant presence (more than half a percent or so) are included in endgroup calculations. The endgroup content is determined by nuclear magnetic resonance $^{13}C$ NMR as is well known in the art.

Suitable feedstocks include purified isobutenes with or without hydrocarbon diluents such as isobutane, hexane and so forth. Purified isobutene is readily available in bulk with purity levels of more than 95% by weight, for example 98.5%+ by weight or 99.5% by weight in some cases. The purified isobutene may be fed with diluents as seen in the examples herein. Other suitable feedstocks include isobutene concentrate, dehydro effluent, or raffinate having typical compositions noted in Tables 1-3 below.

TABLE 1

Isobutylene Concentrate

| Ingredient | Weight % |
|---|---|
| $C_3$ component | 0.00 |
| I-butane | 6.41 |
| n-butane | 1.68 |
| 1-butene | 1.30 |
| I-butene | 89.19 |
| trans-2-butene | 0.83 |
| cis-2-butene | 0.38 |
| 1,3-butadiene | 0.21 |

TABLE 2

Dehydro Effluent

| Ingredient | Weight % |
|---|---|
| $C_3$ components | 0.38 |
| I-butane | 43.07 |
| n-butane | 1.29 |
| 1-butene | 0.81 |
| I-butene | 52.58 |
| trans-2-butene | 0.98 |
| cis-2-butene | 0.69 |
| 1,3-butadiene | 0.20 |

TABLE 3

Raff-1

| Ingredient | Weight % |
|---|---|
| $C_3$ components | 0.357 |
| I-butane | 4.42 |
| n-butane | 16.15 |
| 1-butene | 37.22 |
| I-butene | 30.01 |
| trans-2-butene | 8.38 |
| cis-2-butene | 2.27 |
| 1,3-butadiene | 0.37 |
| Other | 0.61 |

One of skill in the art will appreciate that the feedstock may need to be purified to remove water and oxygenates such as alcohols, ethers and so forth to avoid adverse effects on the catalyst. Typical media for removal of impurities from hydrocarbon feed streams use molecular sieves, activated alumina and other hybrid adsorbents. A suitable absorbent to reduce water and oxygenate levels to desired limits is UOP AZ 300 (Des Plaines, Ill., USA). Post treatment, prior to feeding to the reactor, the feed stream preferably has less than 3 ppm of oxygenates and less than 1 ppm of water.

A mid-range vinylidene polymer composition refers to a PIB wherein a first portion of the PIB molecules have alpha position double bonds and a second portion of the molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds, the first and second portions together includes at least 85 mole % of the PIB molecules of the composition and preferably the said first and second portions together include at least 90 mole % of the PIB molecules of the compositions. Typically, the first portion includes less than 72.5 mole % of the PIB molecules of the composition and sometimes less than 70 mole % of the PIB molecules of the composition. In preferred cases, no more than 5 mole % of the PIB molecules of the composition have tetra-substituted double bonds.

"Highly reactive PIB" and like terminology means polyisobutylene polymers with more than 80 mole percent alpha vinylidene terminated molecules.

Kinematic viscosity of the PIB products of the invention is expressed in centistokes, cSt, @100° C. and is preferably measured in accordance with Test Method ASTM D 445.

Molecular weight herein is typically reported as number average molecular weight, in Daltons, and is measured by gel permeation chromatography (GPC). GPC measurements reported herein were carried out using a Viscotek GPCmax® instrument (Malvern instruments, Worcestershire, UK) employing a 3-column set-up (5 µm (particle size) 100 Angstrom (pore size), 5 µm 500 Angstrom, 5 µm $10^4$ Angstrom) and a Refractive Index (RI) detector. Polyisobutylene standards were used to construct the calibration curve.

Polydispersity or PDI is defined as the ratio of the weight average molecular weight divided by the number average molecular weight of the polymer.

"Linear velocity" refers to the velocity of the recirculating reaction mixture in the tubes of the loop reactor and is calculated by dividing the volumetric flow rate of the reaction fluid by the cross-sectional area of the reaction tubes.

Recirculation ratio is calculated as the weight ratio of the reaction mixture recirculated to the feed added to the residual reactor stream.

Residence time is calculated as the volume of the reactor divided by the volumetric feed rate.

Any standard test method referred to herein is the version in effect as of Jan. 1, 2011.

In connection with the manufacture of the product of this invention, there are seen dramatic increases in conversion and improved product quality as pressure differential across a recirculation pump is increased. Without being bound by any particular theory, it is believed that improved heat transfer and mixing, in part, provide the benefits observed. The heat transfer coefficient of the process fluid was increased by increasing the pressure differential across a recirculating pump thereby increasing the velocity of the process fluid in the reactor tubes, likely decreasing the amount of relatively immobile material adjacent the reactor walls. In other words, by increasing the degree of turbulence of the tube side process fluid, the effect of undesirable boundary layer heat and mass transfer phenomena are reduced. The heat transfer is related to the Nusselt number of a fluid. Further, equations such as the Sieder Tate equations (for turbulent flow) provide a way to calculate the Nusselt number. These correlations relate the Nusselt number to the Reynolds number (ratio of inertial to viscous forces) and the Prandtl number (ratio of viscous diffusion to thermal diffusion). A potential problem faced in loop reactors is that there may be an increase in the viscosity of the tube side fluid at the heat transfer surface. This leads to a substantially lower internal heat transfer coefficient and a loss in conversion and productivity. It is seen in the examples which follow that the heat transfer coefficient increases dramatically and unexpectedly as the velocity in the tubes is increased above conventional levels.

EXAMPLES

Figure 2:
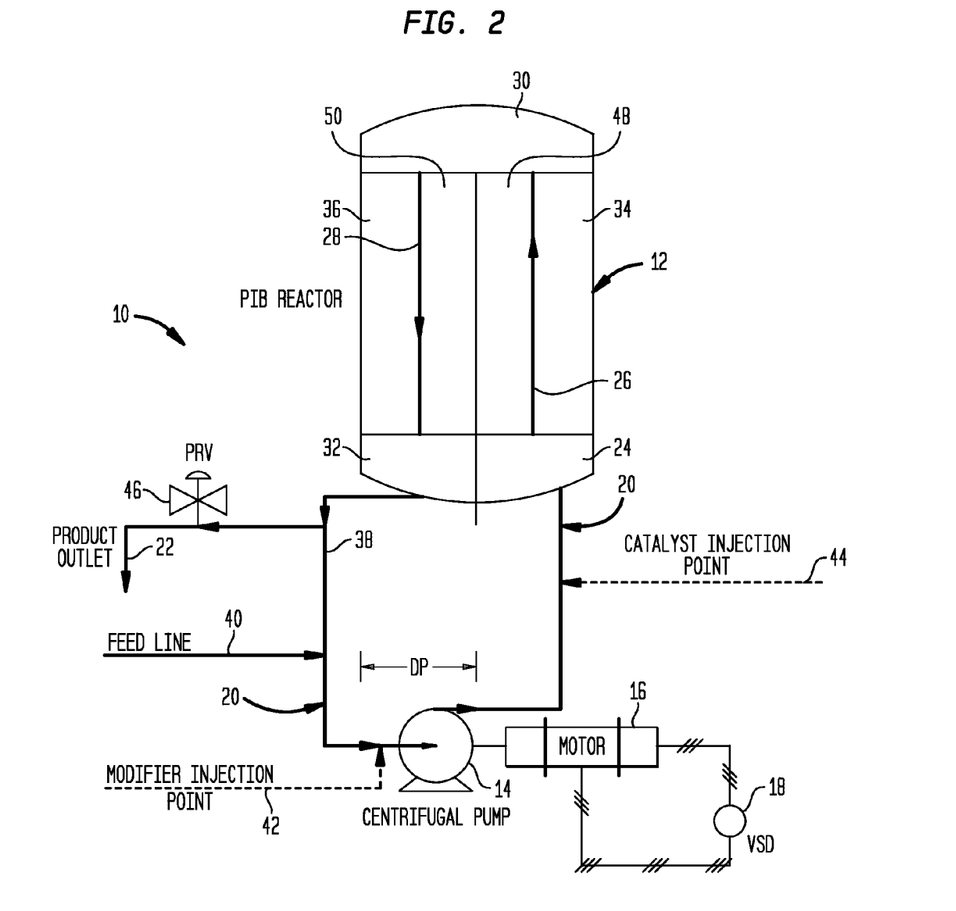
FIG. 2 is a schematic diagram of a loop reactor of the class useful in practicing the present invention.

Operation of the inventive process with a two-pass loop reactor is illustrated and described in connection in FIG. 2. In FIG. 2 there is shown schematically a reactor system 10 which includes a two-pass loop reactor 12, a recirculating pump 14 driven by a motor 16 with a variable speed drive 18, a feed and recirculation loop indicated at 20 and a product outlet at 22.

Reactor 12 includes a feed chamber 24, a plurality of tubes indicated at 26 for upward flow, a plurality of tubes indicated at 28 for downward flow, as well as an upper plenum 30 and a receiving chamber 32 for circulated material. Reactor 12 is conventional in design and known in the art as a 1-2 shell and tube heat exchanger (1 shell, 2 pass). The reactor is suitably provided with 1164 tubes with tube outer diameter of 0.375" and a wall thickness of 0.035". The tubes are surrounded by a shell indicated at 34, 36 for circulating chilled coolant since the polymerization reaction is highly exothermic.

Figure 3:
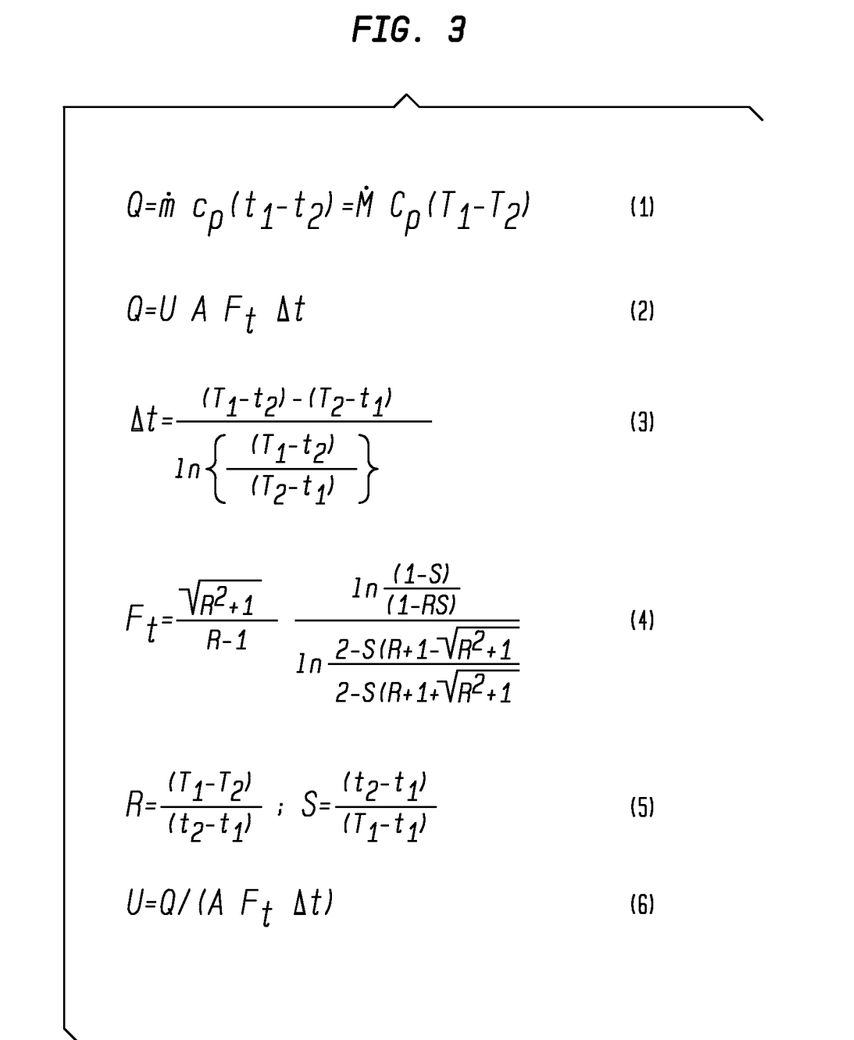
FIG. 3 lists equations useful for determining heat transfer and the overall heat transfer coefficient.

In operation, isobutylene feedstock is fed to a residual reactor stream 38 via a feed line 40 to form a reaction mixture which is optionally provided with catalyst modifier, typically methanol, at an injection point at 42 just upstream of pump 14. Pump 14 operates at a pressure differential, delta P, indicated in FIG. 3 to recirculate the reaction mixture in reactor 12 via loop 20. A catalyst injection port at 44 provides a catalyst complex, for example one comprising a 1:1 molar mixture of methanol and $BF_3$ to the reaction mixture upstream of feed chamber 24.

Variable speed drive 18 contacts motor 16 which drives pump 14 at a pressure differential, delta P, across the pump which, in turn, corresponds to a recirculating flow rate in the reactor for a reaction mixture. The flow characteristics of the reaction mixture are also influenced by temperature in the reactor, molecular weight, monomer and diluent content and so forth as is readily appreciated by one of skill in the art. The flow characteristics of the reaction mixture are thus controlled by feed and catalyst rates, conversion of monomer, mixture composition and the temperatures in the reactor as is seen in the examples which follow. For a given mixture, feed rates and temperature, recirculation rates and hence velocity of the reaction mixture in the tubes of the reactor is most conveniently controlled by controlling the speed of pump 14 to provide a pressure differential, delta P (DP in the diagram), across the pump.

The pump circulates the reaction mixture to feed chamber 24 where the mixture is fed to a plurality of upwardly directed tubes indicated at 26 where it flows to plenum 30 before being transferred to a plurality of downwardly directed tubes indicated at 28 where it flows to receiving chamber 32. A polymerized product is withdrawn at 22 through a pressure relief valve indicated at 46. Residual reactor stream 38 remains in the system and feed line 40 provides fresh monomer to the residual stream as discussed above. Reactor 12 is operated under pressure sufficient to maintain the reaction mixture and its components in liquid form at reaction temperatures, suitably in the range of from about 40° F. to about 90° F. Further details relating to the operation of reactor 12 are provided in European Patent 1 242 464, the disclosure of which is incorporated by reference.

Typically, the inventive process is operated wherein the recirculation rate is much higher than the feed rate as seen in the examples which follow. Coolant in the shell side of the reactor indicated at 34, 36, 48, 50 removes the heat of reaction. Any suitable coolant may be used, for example a 50:50 w/w mixture of water and methanol may be chilled and circulated in the shell section(s) to control reactor temperature.

Utilizing the procedure and materials described above, a 1-2 tube and shell reactor was operated to produce PIB using purified isobutylene diluted with isobutane and a $BF_3$/methanol catalyst and modifier system. Details and results appear in Tables 4 and 5. In Tables 4 and 5, "catalyst complex" refers to a 1:1 w/w mixture of $BF_3$/methanol. In these tables, the heat transfer coefficient, Q, is calculated from the log mean temperature difference as described immediately below and in connection with Equations (1)-(6) of FIG. 3.

The heat transferred (Q) may be calculated either using shell-side (chilling fluid) or tube side (process fluid) data by Equation (1).

Q (BTU/hr) was calculated using tube reaction side data.

The terms in Equation (1) are as follows:

$\dot{m}$=mass flow rate of shell side fluid (methanol-water);
$c_p$=specific heat of the shell side (cooling) fluid;
$t_1$=chiller temperature inlet;
$t_2$=chiller temperature outlet;
M=mass flow rate of tube side fluid (process fluid)
$C_p$=specific heat of the tube side fluid (process fluid)
$T_1$=inlet temp of (reactor) process fluid;
$T_2$=outlet temperature of (reactor) process fluid;

The Fourier Equation for heat transfer relates the overall heat transfer co-efficient; 'U' to the amount of heat transfer (Q). For a 1-2 heat exchanger (1 shell and 2 tube passes), the equation can be written in the form of Equation (2) and Equation (3). (Process heat transfer, D. Q. Kern, McGraw Hill, 1950, pg 144).

$\Delta t$ of Equation (3) is also known as the log mean temperature difference (LMTD);

A=Area available for heat exchange

In Equation (4), $F_t$=fractional ratio of the true temperature difference to the LMTD.

For satisfactory operation of 1-2 heat exchangers, the value of $F_t$ is generally desired to be greater than 0.75 (Process heat transfer, D. Q. Kern, McGraw Hill, 1950, pg 145). $F_t$ can be calculated by Equations (4) and (5) or through figures relating the values of the dimensionless parameters R and S to $F_t$ (FIG. 18, pg 828, Kern, D. Q.).

R and S values for Equation 4 have been calculated in the Tables. $F_t$ has been calculated from the R and S values.

The overall 'U' can be recalculated by rearranging equation (2) into the form shown in Equation (6).

The overall U as shown in equation (6) also appears in Tables 4-7.

TABLE 4

Manufacture of Mid-Range Vinylidene PIB, Nominal Mn of 3000

| Example | Delta Pressure, psi | Conversion, w/w % | Mn | PDI | KVIS-100° C., cSt | Alpha-V | Isobutylene, wt % | Isobutane, wt % |
|---|---|---|---|---|---|---|---|---|
| 1 | 35.00 | 51.20 | 2997 | 2.71 | 3623 | 69 | 89.81 | 10.90 |
| 2 | 34.95 | 52.24 | | | | | 90.28 | 10.96 |
| 3 | 40.03 | 53.94 | | | | | 90.33 | 11.00 |
| 4 | 44.99 | 54.04 | | | | | 90.21 | 11.02 |
| 5 | 49.98 | 55.04 | 3004 | 2.47 | 3361 | 69 | 90.22 | 11.01 |
| 6 | 54.97 | 57.20 | | | | | 90.25 | 10.95 |
| 7 | 54.94 | 57.99 | | | | | 90.90 | 10.25 |
| 8 | 64.97 | 59.39 | | | | | 90.67 | 10.41 |
| 9 | 65.03 | 59.09 | | | | | 90.56 | 10.31 |
| 10 | 65.01 | 59.97 | | | | | 90.46 | 10.26 |
| 11 | 64.96 | 60.18 | | | | | 90.50 | 10.31 |
| 12 | 65.02 | 59.73 | 3118 | 2.36 | 3310 | 67 | 90.41 | 10.52 |

| Example | Delta Pressure, psi | Feed rate, Gal/min | Catalyst Complex, ml/min | % change in catalyst | Methanol, ml/min | % change in methanol | Reactor temp In, ° F. | React temp Out, ° F. |
|---|---|---|---|---|---|---|---|---|
| 1 | 35.00 | 44.89 | 29.03 | 0.00 | 0.00 | 0.00 | 42.69 | 37.94 |
| 2 | 34.95 | 44.99 | 29.71 | 2.34 | 0.00 | 0.00 | 42.78 | 37.91 |
| 3 | 40.03 | 44.83 | 27.17 | −6.38 | 0.00 | 0.00 | 43.15 | 38.32 |
| 4 | 44.99 | 44.79 | 24.53 | −15.50 | 0.00 | 0.00 | 43.09 | 38.55 |
| 5 | 49.98 | 44.86 | 24.90 | −14.23 | 0.00 | 0.00 | 43.07 | 38.62 |
| 6 | 54.97 | 44.90 | 24.67 | −15.01 | 0.00 | 0.00 | 43.27 | 38.85 |
| 7 | 54.94 | 45.04 | 23.88 | −17.75 | 0.00 | 0.00 | 43.22 | 38.86 |
| 8 | 64.97 | 44.93 | 24.41 | −15.91 | 0.00 | 0.00 | 42.96 | 39.00 |
| 9 | 65.03 | 44.87 | 24.43 | −15.83 | 0.00 | 0.00 | 43.43 | 38.97 |
| 10 | 65.01 | 45.05 | 23.78 | −18.07 | 0.00 | 0.00 | 43.15 | 38.95 |
| 11 | 64.96 | 45.02 | 25.05 | −13.70 | 0.00 | 0.00 | 43.26 | 38.95 |
| 12 | 65.02 | 44.92 | 23.52 | −18.97 | 0.00 | 0.00 | 43.11 | 38.97 |

| Example | Delta Pressure, psi | Chiller Temp In, ° F. | Chiller Temp Out, ° F. | Chiller Flow, GPM | Recirc Flow, GPM | Recirc/Feed Ratio | Residence time, mins | PIB production rate, lbs/min |
|---|---|---|---|---|---|---|---|---|
| 1 | 35.00 | −12.37 | −8.80 | 1993 | 1139 | 25.37 | 4.37 | 122 |
| 2 | 34.95 | −12.95 | −9.23 | 2001 | 1147 | 25.50 | 4.36 | 125 |
| 3 | 40.03 | −12.82 | −8.92 | 2000 | 1312 | 29.27 | 4.37 | 129 |
| 4 | 44.99 | −13.08 | −9.26 | 1993 | 1490 | 33.26 | 4.38 | 129 |
| 5 | 49.98 | −12.93 | −9.02 | 2006 | 1652 | 36.84 | 4.37 | 131 |
| 6 | 54.97 | −12.61 | −8.53 | 2000 | 1749 | 38.95 | 4.37 | 137 |
| 7 | 54.94 | −12.93 | −8.80 | 1999 | 1743 | 38.70 | 4.35 | 140 |
| 8 | 64.97 | −13.08 | −8.80 | 1998 | 1917 | 42.66 | 4.36 | 143 |
| 9 | 65.03 | −12.90 | −8.72 | 2000 | 1920 | 42.78 | 4.37 | 141 |
| 10 | 65.01 | −12.27 | −8.01 | 1999 | 1934 | 42.94 | 4.35 | 144 |
| 11 | 64.96 | −12.18 | −7.93 | 2000 | 1934 | 42.95 | 4.35 | 144 |
| 12 | 65.02 | −12.67 | −8.40 | 2001 | 1931 | 42.98 | 4.36 | 143 |

TABLE 4-continued

Manufacture of Mid-Range Vinylidene PIB, Nominal Mn of 3000

| Example | Delta Pressure, psi | Catalyst Complex rate, lbs/min | Turnover number, lbs PIB/lbs catalyst complex | Catalyst Efficiency, % improvement | Tube velocity, Ft/sec | Q, BTU/hr | LMTD | R |
|---|---|---|---|---|---|---|---|---|
| 1 | 35.00 | 0.0896 | 1358 | 0.00 | 8.6 | −1622200 | 50.895 | 1.33 |
| 2 | 34.95 | 0.0917 | 1364 | 0.45 | 8.7 | −1705400 | 51.431 | 1.31 |
| 3 | 40.03 | 0.0839 | 1535 | 13.04 | 9.9 | −2049500 | 51.602 | 1.24 |
| 4 | 44.99 | 0.0757 | 1699 | 25.18 | 11.2 | −2276400 | 51.988 | 1.19 |
| 5 | 49.98 | 0.0768 | 1708 | 25.81 | 12.5 | −2580600 | 51.818 | 1.14 |
| 6 | 54.97 | 0.0761 | 1794 | 32.13 | 13.2 | −2852500 | 51.629 | 1.08 |
| 7 | 54.94 | 0.0737 | 1898 | 39.81 | 13.2 | −2878300 | 51.906 | 1.06 |
| 8 | 64.97 | 0.0753 | 1892 | 39.39 | 14.5 | −3279200 | 51.925 | 0.93 |
| 9 | 65.03 | 0.0754 | 1876 | 38.21 | 14.5 | −3204600 | 52.004 | 1.07 |
| 10 | 65.01 | 0.0734 | 1962 | 44.51 | 14.6 | −3295200 | 51.185 | 0.99 |
| 11 | 64.96 | 0.0773 | 1868 | 37.62 | 14.6 | −3281800 | 51.165 | 1.02 |
| 12 | 65.02 | 0.0726 | 1969 | 45.03 | 14.6 | −3299300 | 51.580 | 0.97 |

| Example | Delta Pressure, psi | S | $F_t$ | $U = Q/(A * delT\_LMTD * F_t)$, Btu/(hr ft² °F.) | increase in ht coeff, % |
|---|---|---|---|---|---|
| 1 | 35.00 | 0.064719 | 0.99890 | 29.09 | 0.00 |
| 2 | 34.95 | 0.066706 | 0.99885 | 30.26 | 4.03 |
| 3 | 40.03 | 0.069802 | 0.99881 | 36.25 | 24.62 |
| 4 | 44.99 | 0.068036 | 0.99892 | 39.96 | 37.37 |
| 5 | 49.98 | 0.069758 | 0.99891 | 45.45 | 56.24 |
| 6 | 54.97 | 0.073000 | 0.99887 | 50.42 | 73.34 |
| 7 | 54.94 | 0.073558 | 0.99888 | 50.61 | 73.98 |
| 8 | 64.97 | 0.076348 | 0.99895 | 57.63 | 98.12 |
| 9 | 65.03 | 0.074131 | 0.99885 | 56.24 | 93.34 |
| 10 | 65.01 | 0.076881 | 0.99885 | 58.75 | 101.98 |
| 11 | 64.96 | 0.076561 | 0.99883 | 58.54 | 101.24 |
| 12 | 65.02 | 0.076612 | 0.99889 | 58.37 | 100.68 |

A = 1097 sq. ft.

TABLE 5

Manufacture of Mid-Range Vinylidene PIB, Nominal Mn of 3300

| Example | Delta Pressure, psi | Conversion, w/w % | Mn | PDI | KVIS-100° C., cSt | Alpha-V | Isobutylene, % | Isobutane, % |
|---|---|---|---|---|---|---|---|---|
| 13 | 34.99 | 51.74 | | | | | 90.48 | 9.81 |
| 14 | 34.97 | 52.06 | | | | | 90.22 | 10.10 |
| 15 | 35.00 | 51.18 | 3208 | 2.67 | 4197 | 67 | 90.33 | 10.14 |
| 16 | 35.07 | 51.70 | | | | | 90.55 | 10.12 |
| 17 | 34.97 | 51.91 | 3284 | 2.62 | 4106 | 68 | 90.54 | 10.19 |
| 18 | 49.94 | 55.10 | | | | | 90.65 | 10.11 |
| 19 | 52.04 | 54.33 | | | | | 90.62 | 10.17 |
| 20 | 55.02 | 55.24 | | | | | 90.57 | 10.18 |
| 21 | 60.02 | 58.09 | 3367 | 2.51 | 4178 | 70 | 90.54 | 10.18 |
| 22 | 64.99 | 61.86 | | | | | 90.31 | 10.02 |
| 23 | 65.06 | 62.04 | 3560 | 2.47 | 4485 | 67 | 90.33 | 10.04 |

| Example | Delta Pressure, psi | Feed rate, Gal/min | Catalyst Complex, ml/min | % change in catalyst | Methanol, ml/min | % change in methanol | Reactor temp in, °F. | React temp Out, °F. |
|---|---|---|---|---|---|---|---|---|
| 13 | 34.99 | 40.41 | 24.13 | 0.00 | 0.00 | 0.00 | 35.10 | 30.35 |
| 14 | 34.97 | 40.31 | 23.69 | −1.80 | 0.00 | 0.00 | 35.89 | 30.19 |
| 15 | 35.00 | 39.92 | 23.52 | −2.53 | 0.00 | 0.00 | 35.38 | 30.23 |
| 16 | 35.07 | 39.80 | 22.98 | −4.77 | 0.00 | 0.00 | 34.95 | 29.77 |
| 17 | 34.97 | 40.10 | 23.34 | −3.26 | 0.00 | 0.00 | 34.74 | 29.85 |
| 18 | 49.94 | 39.91 | 22.33 | −7.44 | 0.00 | 0.00 | 34.01 | 29.64 |
| 19 | 52.04 | 40.07 | 21.51 | −10.86 | 0.00 | 0.00 | 33.02 | 28.74 |
| 20 | 55.02 | 40.15 | 22.51 | −6.70 | 0.00 | 0.00 | 33.24 | 28.81 |
| 21 | 60.02 | 40.00 | 21.38 | −11.40 | 0.00 | 0.00 | 32.92 | 28.94 |
| 22 | 64.99 | 39.96 | 20.74 | −14.05 | 0.00 | 0.00 | 34.92 | 31.00 |
| 23 | 65.06 | 39.97 | 20.76 | −13.95 | 0.00 | 0.00 | 36.12 | 32.43 |

TABLE 5-continued

Manufacture of Mid-Range Vinylidene PIB, Nominal Mn of 3300

| Example | Delta Pressure, psi | Chiller temp in, °F. | Chiller Temp Out, °F. | Chiller Flow, GPM | Recirc Flow, GPM | Recirc/Feed Ratio | Residence time, mins | PIB production rate, lbs/min |
|---|---|---|---|---|---|---|---|---|
| 13 | 34.99 | −12.87 | −9.41 | 1999 | 1182 | 29.26 | 4.85 | 111 |
| 14 | 34.97 | −12.70 | −9.21 | 2002 | 1174 | 29.12 | 4.86 | 112 |
| 15 | 35.00 | −12.76 | −9.29 | 1999 | 1160 | 29.07 | 4.91 | 109 |
| 16 | 35.07 | −12.61 | −9.12 | 2000 | 1182 | 29.70 | 4.92 | 110 |
| 17 | 34.97 | −12.82 | −9.33 | 1998 | 1203 | 30.00 | 4.89 | 111 |
| 18 | 49.94 | −12.88 | −9.15 | 2003 | 1593 | 39.93 | 4.91 | 117 |
| 19 | 52.04 | −12.84 | −9.15 | 2000 | 1645 | 41.06 | 4.89 | 116 |
| 20 | 55.02 | −12.95 | −9.23 | 1999 | 1696 | 42.23 | 4.88 | 118 |
| 21 | 60.02 | −12.62 | −8.75 | 2000 | 1790 | 44.75 | 4.90 | 124 |
| 22 | 64.99 | −12.95 | −8.84 | 2001 | 1935 | 48.41 | 4.90 | 132 |
| 23 | 65.06 | −12.82 | −8.68 | 2000 | 1930 | 48.28 | 4.90 | 132 |

| Example | Delta Pressure, psi | Catalyst Complex rate, lbs/min | Turnover number, lbs PIB/lbs catalyst complex | Catalyst Efficiency, % improvement | Tube velocity, Ft/sec | Q, BTU/hr | LMTD | R |
|---|---|---|---|---|---|---|---|---|
| 13 | 34.99 | 0.0745 | 1497 | 0.00 | 8.9 | −1634600 | 43.860 | 1.38 |
| 14 | 34.97 | 0.0731 | 1525 | 1.91 | 8.9 | −1640400 | 43.988 | 1.63 |
| 15 | 35.00 | 0.0726 | 1498 | 0.09 | 8.8 | −1611100 | 43.822 | 1.48 |
| 16 | 35.07 | 0.0709 | 1548 | 3.42 | 8.9 | −1648400 | 43.222 | 1.49 |
| 17 | 34.97 | 0.0720 | 1541 | 2.97 | 9.1 | −1676600 | 43.364 | 1.40 |
| 18 | 49.94 | 0.0689 | 1704 | 13.83 | 12 | −2375900 | 42.840 | 1.17 |
| 19 | 52.04 | 0.0664 | 1751 | 16.99 | 12.4 | −2429100 | 41.875 | 1.16 |
| 20 | 55.02 | 0.0695 | 1704 | 13.82 | 12.8 | −2522100 | 42.114 | 1.19 |
| 21 | 60.02 | 0.0660 | 1878 | 25.49 | 13.5 | −2765400 | 41.614 | 1.03 |
| 22 | 64.99 | 0.0640 | 2055 | 37.29 | 14.6 | −3185200 | 43.853 | 0.95 |
| 23 | 65.06 | 0.0641 | 2060 | 37.62 | 14.6 | −3198400 | 45.020 | 0.89 |

| Example | Delta Pressure, psi | S | $F_t$ | $U = Q/(A * delT\_LMTD * F_t)$, Btu/(hr ft² °F.) | increase in ht coeff, % |
|---|---|---|---|---|---|
| 13 | 34.99 | 0.072081 | 0.99857 | 34.02 | 0.00 |
| 14 | 34.97 | 0.071930 | 0.99828 | 34.05 | 0.09 |
| 15 | 35.00 | 0.072149 | 0.99844 | 33.57 | −1.34 |
| 16 | 35.07 | 0.073324 | 0.99838 | 34.82 | 2.35 |
| 17 | 34.97 | 0.073315 | 0.99849 | 35.30 | 3.75 |
| 18 | 49.94 | 0.079522 | 0.99851 | 50.63 | 48.82 |
| 19 | 52.04 | 0.080513 | 0.99849 | 52.96 | 55.66 |
| 20 | 55.02 | 0.080549 | 0.99845 | 54.68 | 60.71 |
| 21 | 60.02 | 0.084865 | 0.99851 | 60.67 | 78.32 |
| 22 | 64.99 | 0.086017 | 0.99859 | 66.30 | 94.88 |
| 23 | 65.06 | 0.084712 | 0.99874 | 64.84 | 90.59 |

A = 1097 sq. ft.

Figure 1:
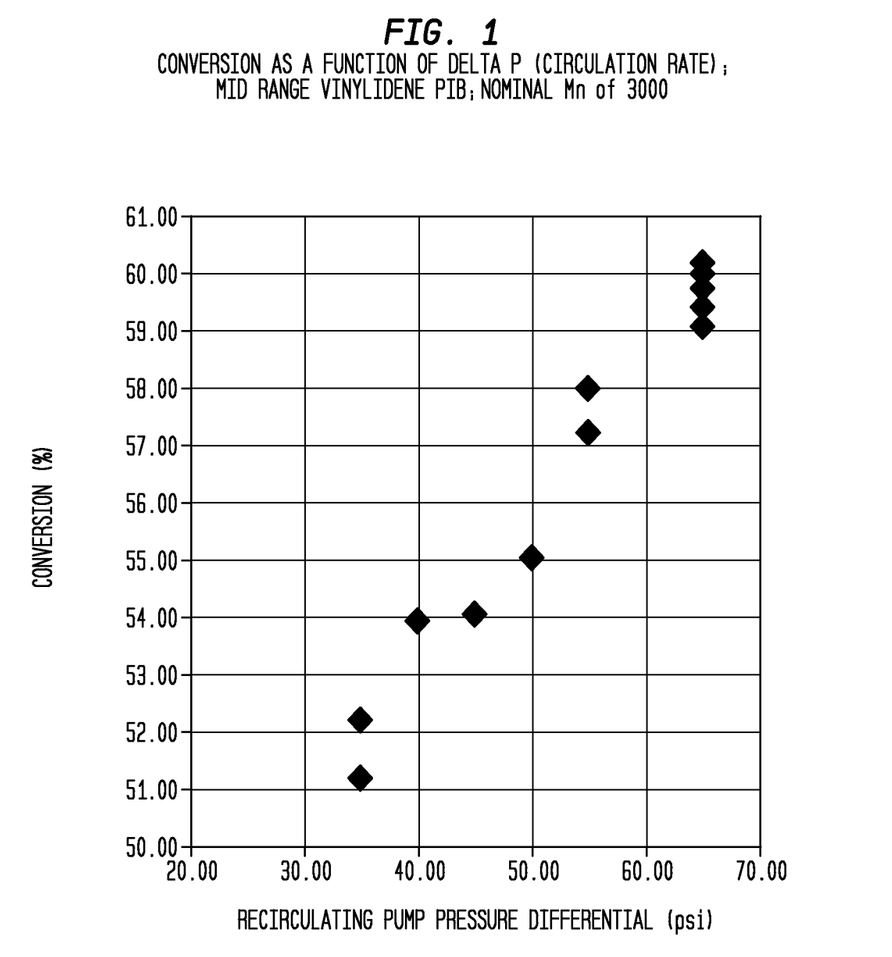
FIG. 1 is a plot of isobutylene conversion to polymer as a function of pressure differential across a recirculating pump in a loop reactor for Mid Range Vinylidene PIB; Nominal Mn of 3000.
Figure 4:
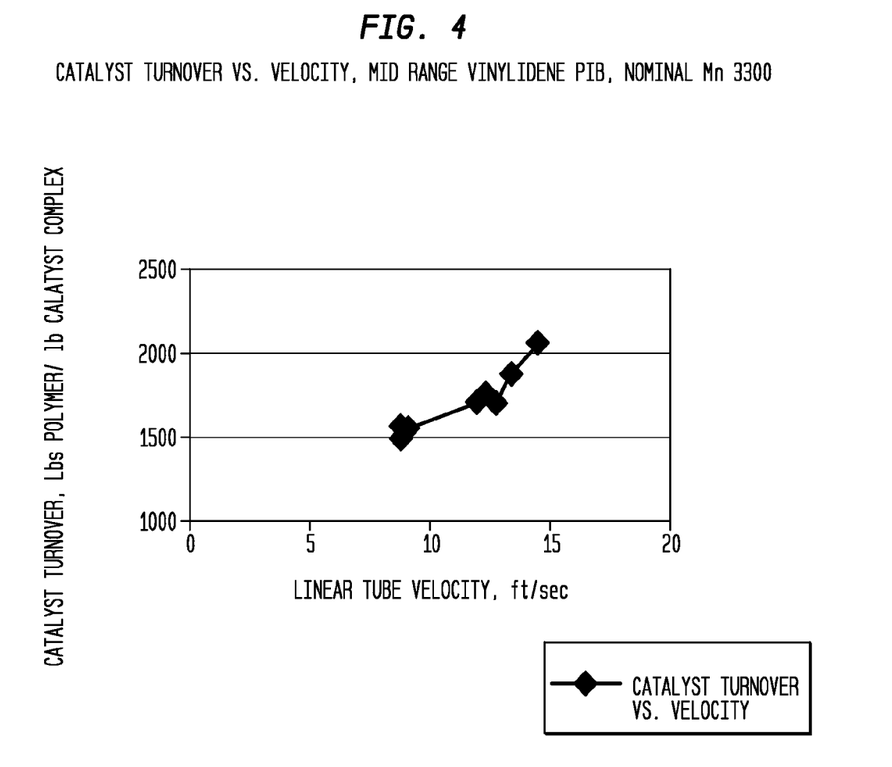
FIG. 4 is a plot of catalyst turnover as a function of the linear velocity of the reaction mixture in the tubes of a loop reactor for Mid Range Vinylidene PIB; Nominal Mn of 3300.

The various features and advantages of the invention are readily apparent from Tables 4 and 5 and the appended Figures. Table 4 provides results for mid-range vinylidine PIB with a weight average molecular weight of 3000 Daltons or so, while table 5 provides results for mid-range vinylidine PIB with a weight average molecular weight of 3300 Daltons or so. FIG. 1 is a plot of isobutylene conversion to polymer as a function of pressure differential across a recirculating pump in a loop reactor for Mid Range Vinylidene PIB of Table 4. FIG. 4 is a plot of catalyst turnover as a function of the linear velocity of the reaction mixture in the tubes of a loop reactor for Mid Range Vinylidene PIB; Nominal Mn of 3300 (Table 5) and FIG. 5 is a plot of isobutylene conversion to polymer as a function of pressure differential across a recirculating pump in a loop reactor for Mid Range Vinylidene PIB of Table 5.

Figure 5:
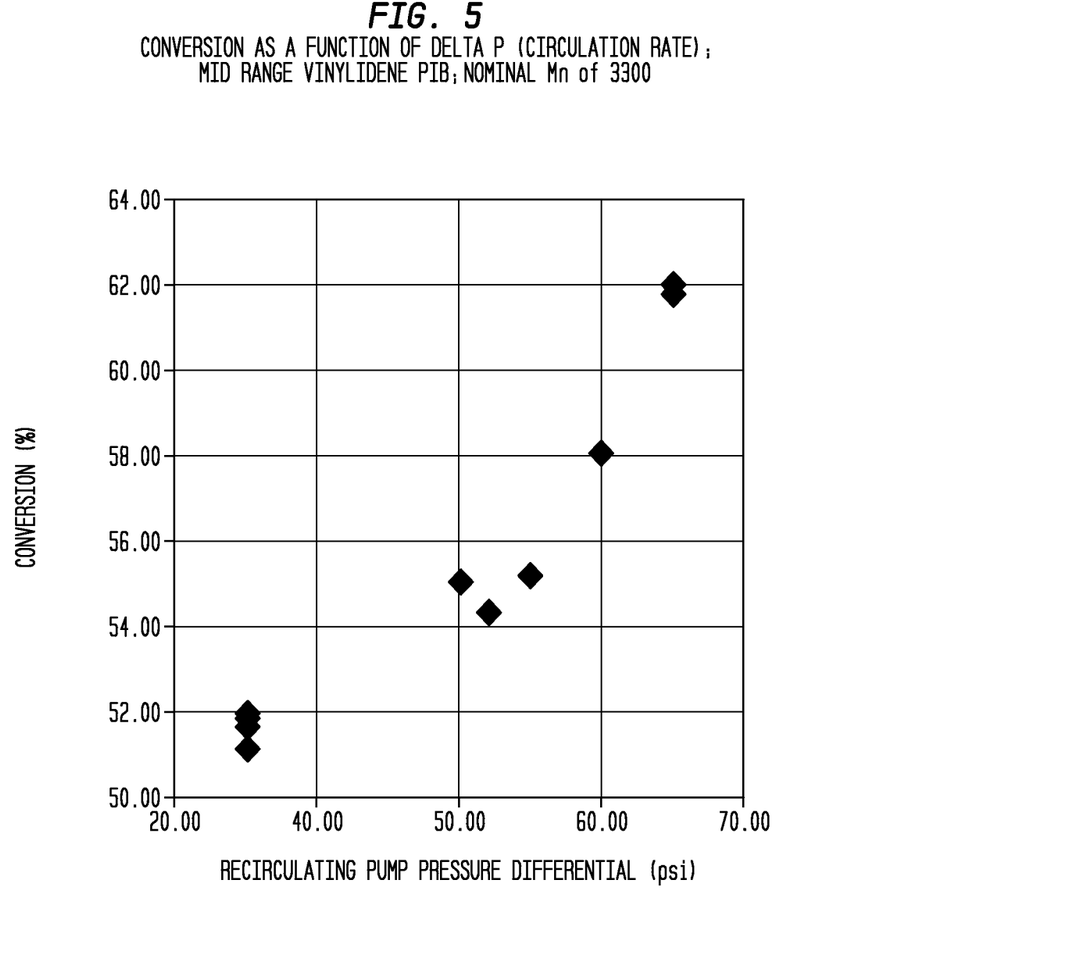
FIG. 5 is a plot of isobutylene conversion to polymer as a function of pressure differential across a recirculating pump in a loop reactor for Mid Range Vinylidene PIB; Nominal Mn of 3300.

It is seen in FIGS. 1 and 5 that conversion increases dramatically as the pressure differential, delta P, across the recirculating pump increases along with the linear velocity of the reaction mixture within the tubes of the reactor. Catalyst productivity also increases dramatically throughout the foregoing examples as pressure differential and linear velocity is increased. Note FIG. 4 where this aspect is illustrated.

The novel compositions of Tables 4 and 5 are compared with conventional mid-range vinylidene polymers in Tables 6 through 9, below.

TABLE 6

Conventional Mid-Range Vinylidene Grade, 3K Nominal Viscosity

| DP | K Visc | Mn | PDI | Mn/PDI |
|---|---|---|---|---|
| 25 | 3243.5 | 2653 | 3.008 | 882.0 |
| 25 | 3089 | 2635 | 2.958 | 890.8 |
| 25 | 3141.36 | 2643 | 2.978 | 887.5 |
| 25 | 3221.6 | 2635 | 3.038 | 867.3 |
| Average | 3173.87 | 2641.5 | 2.9955 | 881.8 |

TABLE 7

Mid-Range Vinylidene Grade, High Circulation, 3K Nominal Viscosity

| DP | K Visc | Mn | PDI | Mn/PDI |
|---|---|---|---|---|
| 35 | 3622.51 | 2997 | 2.707 | 1107.1 |
| 45 | 3298.05 | 2995 | 2.487 | 1204.3 |
| 50 | 3360.85 | 3004 | 2.473 | 1214.7 |
| 55 | 3332.77 | 3019 | 2.446 | 1234.3 |
| 60 | 3303.57 | 3028 | 2.431 | 1245.5 |
| 65 | 3310.09 | 3118 | 2.359 | 1321.7 |
| Average | 3371.30 | 3026.8 | 2.484 | 1218.52 |

TABLE 8

Conventional Mid-Range Vinylidene Grade, 4K Nominal Viscosity

| DP | K Visc | Mn | PDI | Mn/PDI |
|---|---|---|---|---|
| 25 | 4125.7 | 3074 | 2.79 | 1101.8 |
| 25 | 4222.01 | 3099 | 2.73 | 1135.16 |
| 25 | 4352.57 | 3131 | 2.77 | 1130.3 |
| Average | 4233.43 | 3101.33 | 2.76333 | 1122.32 |

TABLE 9

Mid-Range Vinylidene Grade, High Circulation, 4K Nominal Viscosity

| DP | K Visc | Mn | PDI | Mn/PDI |
|---|---|---|---|---|
| 35 | 4106.4 | 3208 | 2.672 | 1200.6 |
| 35 | 4265.8 | 3284 | 2.622 | 1252.5 |
| 60 | 4145.19 | 3367 | 2.513 | 1339.8 |
| 65 | 4383.38 | 3560 | 2.468 | 1442.46 |
| Average | 4225.19 | 3354.75 | 2.569 | 1385.06 |

It is seen in Tables 6 through 9 that the new mid-range vinylidene polymers produced at high velocity and recirculation rates have higher molecular weight and lower polydispersity at a given kinematic viscosity. The novel PIB polymers thus provide a more uniform product which may be derivatized. Lower polydispersity is particularly valuable in fuel additives where compositions with lower polydispersity cause less engine deposits than compositions with higher polydispersity.

Catalyst productivity (efficiency) is unexpectedly improved as compared to prior art systems and HR PIB compositions. In Table 10, the process of the invention is compared with prior art reaction systems and highly reactive (HR) PIB compositions. Compositions HR-C1 and HR-C2 were made in the same apparatus as Examples 12 and 23, but were produced at lower temperatures with more methanol in order to increase vinylidene content.

Details as to calculation are summarized in Table 11. Catalyst productivity is about 2000 lbs polymer/lb catalyst complex with the process of the invention versus from about 150 lbs polymer/lb catalyst complex to about 300 lbs polymer/lb catalyst complex as reported in the prior art. Catalyst productivity when making HR vinylidine PIB is about 1000 lbs polymer/lb catalyst complex or less. When calculated based on $BF_3$ only, similar increases in catalyst productivity are provided when making the compositions of the invention.

TABLE 10

Comparison of Catalyst Productivity

| Source | Ex. | TON lbs polymer/ lbs catalyst complex | TON - $BF_3$ lbs polymer/ lbs $BF_3$ | Mn Daltons |
|---|---|---|---|---|
| Table 4 | 12 | 1969.70 | 2896.61 | 3118 |
| Table 5 | 23 | 2059.28 | 3028.36 | 3560 |
| HR-C1 |  | 1003.8 | 1476.1 | 1087 |
| HR-C2 |  | 784.7 | 1153.9 | 2419 |
| U.S. Pat. No. |  |  |  |  |
| 7,038,008 | 1 | 323.04 | 888.07 | 2387 |
| 7,038,008 | 2 | 115.84 | 318.45 | 956 |
| 7,217,773 | comp | 171.72 | 321.21 | 980 |
| 7,217,773 | 1 | 204.6 | 405.06 | 930 |
| 7,485,764 | 1 | 238.48 | 407.52 | 1150 |
| 7,485,764 | 2 | 189.11 | 407.52 | 1070 |
| 7,485,764 | 3 | 157.15 | 407.52 | 1030 |

TABLE 11

Calculation of Catalyst Productivity

| Source | Ex. | Alcohol | $BF_3$ | $BF_3$ wt (lbs) | Alcohol | Alcohol wt (lbs) | Total Complex wt | Isobutylene flow | Conversion w/w % | PIB lbs/min | TON lbs polymer/ lbs complex |
|---|---|---|---|---|---|---|---|---|---|---|---|
| Table 4 | 12 | Methanol |  | 0.049368 |  | 0.023232 | 0.0726 |  |  | 143 | 1969.70 |
| Table 5 | 23 | Methanol |  | 0.043588 |  | 0.020512 | 0.0641 |  |  | 132 | 2059.28 |
| HR-C1 |  | Methanol |  | 0.129608 |  | 0.060992 | 0.1906 |  |  | 191 | 1003.8 |
| HR-C2 |  | Methanol |  | 0.145044 |  | 0.068256 | 0.2133 |  |  | 167 | 784.7 |
| U.S. Pat. No. |  |  | mmoles | (gms) | mmoles | (gms) |  |  |  | g/min |  |
| 7,038,008 | 1 | 2-butanol | 7.1 | 0.48138 | 11.36 | 0.8420032 | 1.3233832 | 450 | 0.95 | 427.5 | 323.04 |
| 7,038,008 | 2 | 2-butanol | 19.8 | 1.34244 | 31.68 | 2.3481216 | 3.6905616 | 450 | 0.95 | 427.5 | 115.84 |
| 7,217,773 | comp | Methanol | 8.55 | 0.57969 | 15.75 | 0.50463 | 1.0843 | 196 | 0.95 | 186.2 | 171.72 |
| 7,217,773 | 1 | Methanol | 6.78 | 0.459684 | 14.06 | 0.4504824 | 0.9102 | 196 | 0.95 | 186.2 | 204.6 |
| 7,485,764 | 1 | Methanol | 10 | 0.678 | 15 | 0.4806 | 1.1586 | 307 | 0.9 | 276.3 | 238.48 |
| 7,485,764 | 2 | Ethanol | 10 | 0.678 | 17 | 0.78302 | 1.46102 | 307 | 0.9 | 276.3 | 189.11 |
| 7,485,764 | 3 | Isopropanol | 10 | 0.678 | 18 | 1.08018 | 1.75818 | 307 | 0.9 | 276.3 | 157.15 |

Catalyst consumption is much lower than in the prior art and much lower than seen in connection with highly reactive PIB manufacture. Moreover, it is seen in tables 4 and 5 that catalyst consumption becomes even lower as circulation rates increase.

From the foregoing, it will be appreciated that conversion unexpectedly increases with increased recirculation rates at the same residence time, contrary to the teachings of the prior art. Higher yield is realized without significant additional capital or processing costs. It was also found that polydispersity decreases with substantially the same residence time as circulation rates increase all other things being equal. The products produced have unexpectedly lower polydispersities especially at higher molecular weight, also contrary to the teachings of the prior art. This feature is particularly desirable when the products are used for making derivatives such as alkyl phenols and/or fuel or lubricating oil additives.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference, further description is deemed unnecessary. In addition, it should be understood that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A mid-range vinylidene content, high viscosity PIB polymer composition comprising PIB molecules, wherein a first portion of said PIB molecules have alpha position double bonds and a second portion of said PIB molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds, said composition having a polydispersity of no more than 2.7; and being further characterized in that the composition has a kinematic viscosity as measured at 100° C. in accordance with Test Method ASTM D 445 in the range of 3000 cSt to 5000 cSt, a number average molecular weight, Mn, in the range of 2800 Daltons to 4000 Daltons and a ratio of Mn:PDI of greater than 1100.

2. The composition according to claim 1, having a PDI of no more than 2.5.

3. The composition according to claim 1, having a ratio of Mn:PDI of greater than 1300.

4. The composition according to claim 1, wherein said first portion includes less than 70 mole % of the PIB molecules of the composition.

5. The composition according to claim 1, wherein said first and second portions together include at least 85 mole % of the PIB molecules of the composition.

6. The composition according to claim 1, wherein no more than 5 mole % of the PIB molecules of the composition have tetra-substituted double bonds.

7. A mid-range vinylidene content, high viscosity PIB polymer composition comprising PIB molecules, wherein a first portion of said PIB molecules have alpha position double bonds and a second portion of said PIB molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds, said composition having a polydispersity of no more than 2.8; and being further characterized in that the composition has a kinematic viscosity as measured at 100° C. in accordance with Test Method ASTM D 445 in the range of 3000 cSt to 3700 cSt, a number average molecular weight, Mn, in the range of 2800 Daltons to 4000 Daltons and a ratio Mn:PDI of greater than 1100.

8. The composition according to claim 7, having a PDI of no more than 2.5.

9. The composition according to claim 7, having a ratio of Mn:PDI of greater than 1200.

10. The composition according to claim 7, having a ratio of Mn:PDI of greater than 1250.

11. The composition according to claim 7, having a ratio of Mn:PDI of up to 1500.

12. The composition according to claim 7, wherein no more than 5 mole % of the PIB molecules of the composition have tetra-substituted double bonds.

13. A mid-range vinylidene content, high viscosity PIB polymer composition comprising PIB molecules, wherein a first portion of said PIB molecules have alpha position double bonds and a second portion of said PIB molecules have beta position double bonds, wherein said first and second portions together include at least 80 mole % of the PIB molecules of the composition, wherein said first portion includes less than 75 mole % of the PIB molecules of the composition, and wherein no more than 10 mole % of the PIB molecules of the composition have tetra-substituted double bonds, said composition having a polydispersity of no more than 2.7; and being further characterized in that the composition has a kinematic viscosity as measured at 100° C. in accordance with Test Method ASTM D 445 in the range of 3750 cSt to 5000 cSt, a number average molecular weight, Mn, in the range of 3000 Daltons to 3800 Daltons and a ratio of Mn:PDI of greater than 1200.

14. The composition according to claim 13, wherein the composition has a kinematic viscosity as measured at 100° C. in accordance with Test Method ASTM D 445 in the range of from 3800 cSt to 4500 cSt.

15. The composition according to claim 13, having a PDI of no more than 2.5.

16. The composition according to claim 13, having a ratio of Mn:PDI of greater than 1300.

17. The composition according to claim 13, wherein said first and second portions together include at least 85 mole % of the PIB molecules of the composition.

18. The composition according to claim 13, wherein said first and second portions together include at least 90 mole % of the PIB molecules of the composition.

19. The composition according to claim 13, wherein no more than 5 mole % of the PIB molecules of the composition have tetra-substituted double bonds.

20. The composition according to any of claims 1, 7 or 13 prepared in a loop reactor operated at a linear tube velocity of 8.6 ft/sec or more.

* * * * *